Patented Apr. 4, 1950

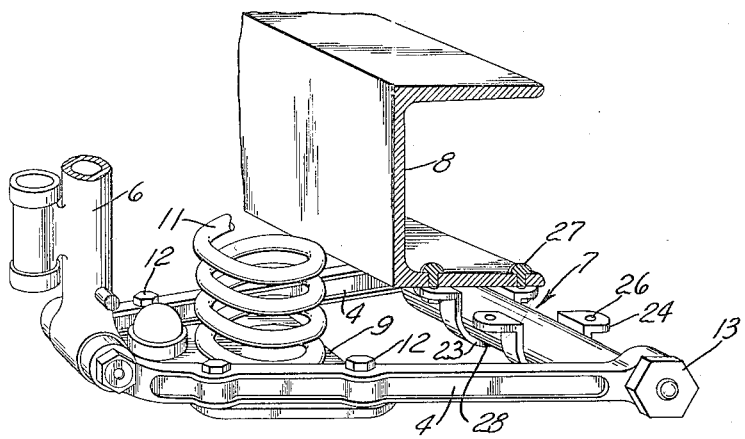

2,502,744

UNITED STATES PATENT OFFICE 2,502,744

CONTROL ARM SHAFT AND MOUNTING THEREFOR

Warren H. Parker, Oakland, Calif.

Application April 24, 1947, Serial No. 743,627

5 Claims. (Cl. 280—124)

This invention relates to control arm shafts used as pivot mountings for the so-called "knee-action" wheel suspension apparatus of motor vehicles.

An object of the invention is to provide a control arm shaft associated with the type of apparatus described which may be installed in or removed from the apparatus without substantially completely dissembling the latter as is now generally practiced when said shaft is to be replaced or removed for any other reason.

Another object of the invention is to provide a control arm shaft which, unlike the presently used shafts of this character, provides for correctional adjustment of wheel suspension apparatus so as to properly position the vehicle wheels in relation to the road surface.

A further object of the invention is to provide a control arm shaft which is capable of more economical manufacture than are the conventional shafts of this character.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawing:

Figure 1 is a perspective view, partly in section, of a portion of a vehicle wheel suspension apparatus showing the control arm shaft and mounting of my invention associated therewith.

Figure 2 is a perspective view, similar to the corresponding portion of Figure 1, showing the control arm shaft in partially assembled relation with the control arms of the wheel suspension apparatus.

Figure 3 is an enlarged vertical sectional view of a portion of the wheel suspension apparatus taken in the plane indicated by the line 3—3 of Figure 2.

Figure 4 is a perspective view of one of the eccentric bushings which may form part of the improved apparatus of my invention.

In the generally standard form of front wheel suspension apparatus for vehicles, commonly referred to as the "knee action," a pair of control arms 4 is provided having pivotally connected to their outer ends the steering knuckle support 6 carrying the spindle and wheel, not shown, and having their inner ends likewise pivotally mounted on a control arm shaft, generally indicated by the numeral 7, which is fixed to the lower flange of the vehicle frame 8 or similar structure. Usually, the control arms 4 are spanned by a plate or spring seat 9 which supports the lower end of the coil spring 11 and which are secured to the control arms by bolts 12. In many cases the attachment is effected by rivets instead of the bolts 12. The control arm shaft 7, due to the substantially constant movement of the control arms while the vehicle is being driven, is one of the most rapidly wearing parts in the vehicle undercarriage and due to the particular position of the pivot bearings any great amount of wear therein may adversely affect the camber and caster of the wheels and thereby seriously interfere with proper steering and control of the vehicle. When such shafts 7 become worn, they and their journal bushings 13 must be replaced thus entailing complete dismantling of the wheel suspension apparatus due to the fact that the control arm shaft cannot be removed or replaced without horizontally spreading the arms. The main reason for this is, that the conventional shaft is a drop forging and has integral ears thereon, used for bolting the shaft to the frame 8, which limit axial movement of the shaft relative to the control arms. Where bolts 12 are employed to secure the spring seat to the arms, the task of dismantling is lessened somewhat but when rivets are encountered the latter must be cut off and later replaced with bolts when the apparatus is being reassembled after insertion of the new control arm shaft. These additional operations contribute materially to the complexity of the repair job and consequently are reflected in increased charges to the customer.

I have provided an improved control arm shaft and mounting means therefor which will permit a mechanic to replace a worn or otherwise damaged shaft without the necessity of disturbing other parts of the wheel suspension mechanism. In addition, the structure of my invention provides for radial adjustment of the shaft so as to afford variable positioning of the wheel relative to the road surface in the establishment or correction of said wheel position to produce the best operating conditions. As is best shown in Figure 2, I provide a shaft 14 of cylindrical cross-sectional form having integral, axially-parallel studs 16 extending from the opposite ends thereof and provided with transaxial shoulders 17 at the junctions of the studs with the shaft. The distance between the shoulders 17, longitudinally of the shaft may be made only slightly less than the distance between the confronting faces 18 of the eyes 19 of the control arms 4 so that the shaft may be operatively positioned therebetween with a minimum of end play while the extending studs 16 are arranged for positioning within the bores 21 of the eyes 19. It is also contemplated to construct the shaft with a dimension between the shoulders 17 which will permit a desired maximum amount of longitudinal movement of the shaft relative to the eyes 19, shim washers or solid spacers being inserted in the gaps between the shoulders and eyes and in concentric engagement with the studs 16 for variably adjusting the position of the shaft longitudinally relative to the control arm eyes. The diameter of the shaft 14 is made only slightly smaller than the bore 21 so as to permit entry of the shaft into the latter. The studs 16 are threaded and possess a diameter sufficiently small to enter the correspondingly threaded bores 22 of the bushings 13. It will be noted that the studs and the shaft are eccentrically related so as to gain as much offset relationship as possible between the axes thereof; in fact, the respective peripheries of the studs and shaft are made tangent to each other at one point. In actual physical size, the shaft is about seven-eights of an inch in diameter while the studs are about five-eighths of an inch in diameter. This gives a full one-eighth of an inch of eccentricity between the parts which is useful in a manner described hereinafter.

In Figure 4, I have shown a bushing 15 provided with a bore 22 which is radially offset relative to the axis of the bushing a distance substantially equal to the degree of eccentricity of the studs 16 relative to the shaft 14. This eccentricity of the bore 22, together with the eccentric arrangement of the studs 16 may provide for a full quarter-inch of adjustment movement of the shaft 14 radially of the axis of the control arm eyes 19.

Associated with the shaft 14, but not originally connected thereto, I provide, preferably, a pair of mounting elements each of which may comprise a metal strap formed to provide a U-shaped stirrup 23 shaped to transaxially straddle the shaft and provided with oppositely outwardly-turned ears 24 having apertures 26 therein for the reception of bolts 27 which secure the stirrups to the vehicle frame 8. If desired, a two-piece split collar type of shaft bracket or stirrup may be employed which can be secured to the frame by bolts passing through lugs equivalent to the lugs 24 or in any other suitable manner. An important feature of the construction is that the depth of the shaft-receiving recess in each stirrup measured from the upper face of the ears 24 to the bottom of the recess is slightly less than the diameter of the shaft 14 so that when the bolts 27 are tightened, the shaft will be securely clamped between the stirrup and the lower surface of the frame 8. In the case of the split collar bracket, the shaft-receiving bore of the clamp would, of course, be made smaller in diameter than the shaft. In the interests of standardization, the centers of the apertures in each stirrup are made identical with the similar positions of the apertures in the drop forged shaft which is to be replaced so as to register with the existing bolt holes provided in the frame flange.

In the operation of replacing a worn or otherwise damaged control arm shaft, the bushings 13 and other minor associated parts are first removed after which the bolts 27 are taken out to free the shaft. Using a hacksaw, cutting torch or other suitable device, the worn or damaged shaft is cut in half medially of its ends whereupon the severed portions may be separately detached from the control arms. The shaft of my invention may then be substituted for the removed shaft by passing the entire shaft axially through one of the eyes 19 from the outer surface thereof until the preceding stud enters the opposite eye whereupon the bushings 13 may be attached to the studs 16 to connect the shaft to the control arms; or, if desired, one end of the shaft 14 may be inserted through one of the eyes from the inner surface thereof until the other end portion of the shaft may be brought into substantial axial registry with the other eye whereupon by slightly withdrawing the shaft from the first eye the stud will be caused to enter the second eye whereupon the bushings may be attached as aforesaid. With the new shaft in place, the stirrups 23 or other mounting brackets may be applied and connected to the frame by the bolts 27. Due to the eccentric relationship between the shaft 14, its end studs 16 and the bushing 15 it will be seen that by rotating the shaft 14 and/or the bushings the control arms 4 may be adjusted as to position transversely of the vehicle frame or the pivotal center of the control arms may be raised or lowered relative to the frame as may be desired. Also the method of mounting the shaft on the frame permits of a certain amount of axial adjustment of the shaft in relation to the frame. The rotational adjustability of the shaft may be utilized to correct or reestablish camber of the steering wheels, that is, the slight vertical angular relationship that properly exists between the wheels and the road surface while the second type of longitudinal adjustability may be employed to establish so-called "caster" of the kingpin wherein the axis of the latter is also angularly related to the surface of the road to facilitate steering of the vehicle. This latter adjustment may be obtained by varying the thickness and positions of the shims as aforesaid, by shifting the shaft axially relative to the brackets, or both. Indicative settings of the shaft may be observed by the relative positions of reference marks 25 applied to the shaft and its mounting brackets. After the proper setting of the shaft has been found, the bolts 27 are tightened to securely bind the shaft to the frame. For all intents and purposes, such frictional securing of the shaft will be sufficient, under average operation conditions, to maintain the position of the shaft. However it may be desirable, when severe usage of the vehicle may be anticipated, to further secure the shaft in place by tack-welding it, as at the points 28, to the stirrups or in any other suitable manner which will provide permanent connection between the parts.

It will be seen from the preceding description of my invention that I have provided an improved control arm shaft and mounting means for use in the so-called "knee-action" mechanisms of vehicles which are not only capable of less expensive production than the generally used drop-forged corresponding parts but which also provide adjustment of the mechanism, which the inflexible presently-used devices are incapable of providing and which also greatly facilitate repair jobs resulting in a material reduction in expense to the customer.

I claim:

1. In a "knee-action" vehicle wheel suspension mechanism including a pivoted control arm positioned adjacent to the frame of the vehicle having an apertured eye at one end thereof and an eccentrically bored bushing engageable in said eye and forming a portion of the pivot mounting for said control arm, a shaft mounted adjacent to said vehicle frame having a portion thereof entering the bore of said bushing to provide pivotal connection of the control arm with the shaft, means for adjustably and selectively positioning the portion of said shaft entering said bushing radially relative to the vehicle frame, and means for securing said shaft in a selected adjusted position thereof to said vehicle frame.

2. In a "knee-action" vehicle wheel suspension mechanism including a pivoted control arm positioned adjacent to the frame of the vehicle having an apertured eye at one end thereof and an eccentrically bored bushing engageable in said eye and forming a portion of the pivot mounting for said control arm, a rotatable shaft mounted adjacent said vehicle frame having a portion thereof entering the bore of said bushing to provide pivotal connection of the control arm with the shaft, said portion being positioned in axially parallel and radially offset relationship to the axis of said shaft, means for adjustably and selectively positioning the portion of said shaft entering said bushing radially and axially relative to the vehicle frame, and means for securing said shaft in a selected adjusted position of rotation or axial movement thereof to said vehicle frame.

3. In a "knee-action" vehicle wheel suspension mechanism including a pivoted control arm positioned adjacent to the frame of the vehicle having an apertured eye at one end thereof and a bored bushing engageable in said eye and forming a portion of the pivot mounting for said control arm, a shaft mounted adjacent to said vehicle frame having a radially offset portion thereof entering the bore of said bushing to provide pivotal connection of the control arm with the shaft, stirrups surrounding said shaft and secured to the vehicle frame, said stirrups providing journaling means for the shaft in which the latter may be rotatably and axially moved so as to vary the position of the pivot mounting for the control arm relative to the vehicle frame, and means for securing said shaft against rotation relative to said stirrups.

4. In a "knee-action" vehicle wheel suspension mechanism including a pivoted control arm positioned adjacent to the frame of the vehicle having an apertured eye at one end thereof and a bored bushing engageable in said eye and forming a portion of the pivot mounting for said control arm, a shaft mounted adjacent to said vehicle frame having a maximum diameter permitting entry of the shaft into the aperture of said control arm eye and provided with a stud extension of lesser diameter entering the bore of said bushing to provide pivotal connection of the control arm with the shaft, stirrups connected with said frame and having recessed portions transaxially straddling said shaft and providing therefore journals in which said shaft may be rotatably and axially moved so as to adjustably position said control arm relative to the vehicle frame, and bolts connecting said stirrups and frame which may be tightened to secure the shaft to the frame in a selected position of adjustment.

5. In a "knee-action" vehicle wheel suspension mechanism including a pivoted control arm positioned adjacent to the frame of the vehicle having an apertured eye at one end thereof and a bored bushing engageable in said eye and forming a portion of the pivot mounting for said control arm, a shaft mounted adjacent to said vehicle frame having a maximum diameter permitting entry of the shaft into the aperture of said control arm eye and provided with a stud extension of lesser diameter entering the bore of said bushing to provide pivotal connection of the control arm with the shaft, said stud being positioned in axially parallel and radially offset relationship to the axis of the shaft, stirrups connected with said frame and having recessed portions transaxially straddling said shaft and providing therefor journals in which said shaft may be rotatably and axially moved so as to adjustably position said control arm relative to the vehicle frame, said recessed portions of the stirrups each being of lesser depth than the diameter of the shaft journaled therein, and bolts interconnecting the stirrups and frame which may be tightened to clamp said shaft between said frame and the bottom portions of said recesses so as to secure the shaft in a selected position of adjustment thereof.

WARREN H. PARKER.

REFERENCES CITED

The following references are of record in the file of this patent:

UNITED STATES PATENTS

| Number | Name | Date |
| --- | --- | --- |
| 2,065,071 | Harris | Dec. 22, 1936 |
| 2,096,116 | Leighton | Oct. 19, 1937 |
| 2,123,089 | Leighton | July 5, 1938 |